Dec. 1, 1942.  A. BOYNTON  2,303,323
VALVE
Filed Jan. 31, 1939  3 Sheets-Sheet 1

ALEXANDER BOYNTON, INVENTOR,
BY Jesse P. Stone
Lester B Clark
ATTORNEY.

Dec. 1, 1942.　　　A. BOYNTON　　　2,303,323
VALVE
Filed Jan. 31, 1939　　　3 Sheets-Sheet 2

ALEXANDER BOYNTON, INVENTOR,

BY Jesse R Stone
Lester B Clark

ATTORNEY.

Dec. 1, 1942. A. BOYNTON 2,303,323
VALVE
Filed Jan. 31, 1939 3 Sheets-Sheet 3
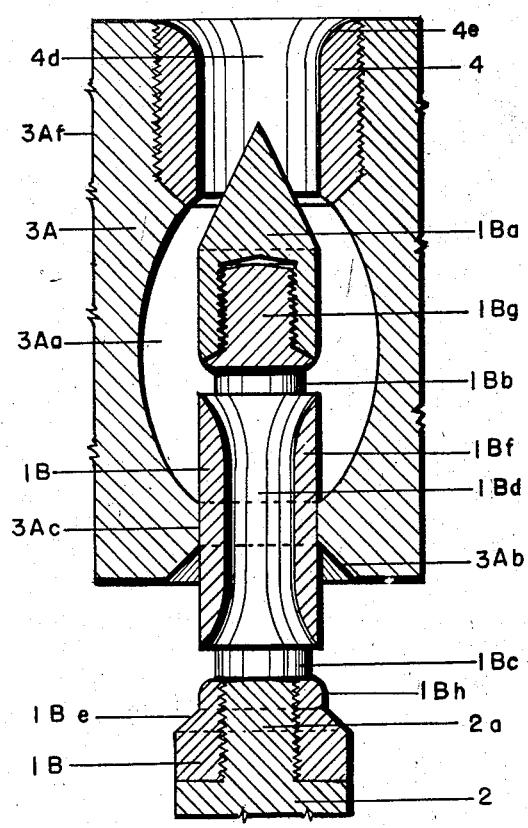
Fig. 9.
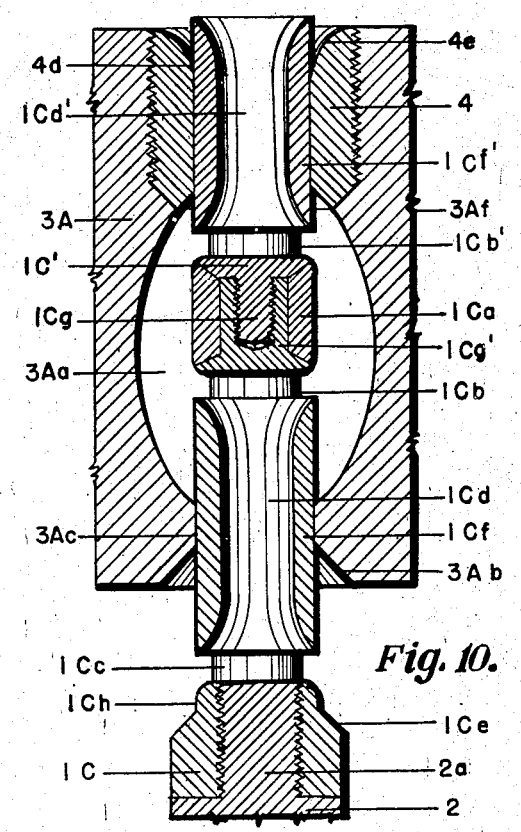
Fig. 10.
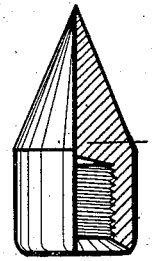
Fig. 11.
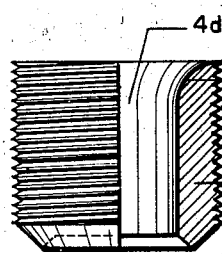
Fig. 14.
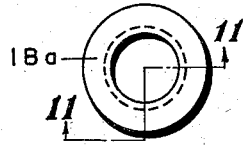
Fig. 12.
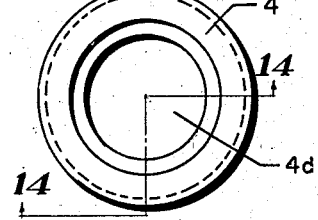
Fig. 15.
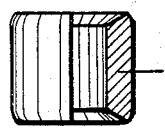
Fig. 13.
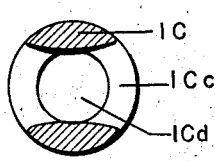
Fig. 16.
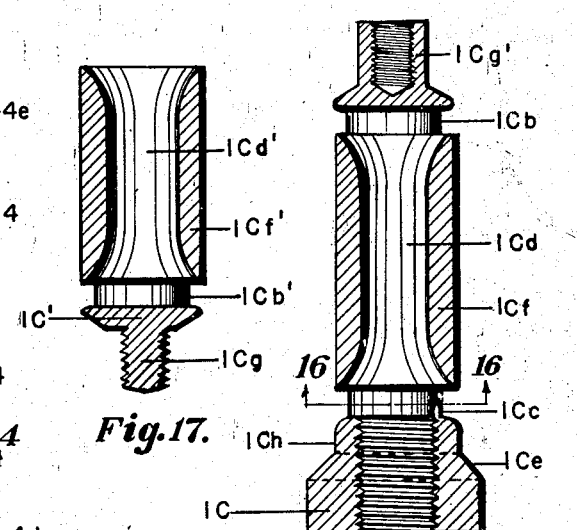
Fig. 17.
Fig. 18.
ALEXANDER BOYNTON, INVENTOR,
BY Jesse R. Stone
Lester B. Clark
ATTORNEY.

Patented Dec. 1, 1942

2,303,323

UNITED STATES PATENT OFFICE 2,303,323

VALVE

Alexander Boynton, San Antonio, Tex.

Application January 31, 1939, Serial No. 253,878

7 Claims. (Cl. 251—78)

My invention relates to valves.

An object of this invention is to provide a valve and valve seat neither of which is exposed to the abrasive force of fluid.

A further object is to provide mechanism wherein nearly all of the wear is upon minor parts which may be replaced at minimum cost.

In carrying out the simplest form of this invention, I employ a valve and valve seat, and upon the valve member above the valve I attach a tubular portion having a close sliding fit within an opening above the valve seat and having an inlet proximately above the valve and an outlet discharging into a chamber at the upper end of which is an opening within which a solid extension of the tubular portion above the valve has a close sliding fit.

In another form of the invention I employ all the elements of the first form and add a second tubular portion to protect the discharge opening in the female member from the abrasive section of fluid.

In other forms of the invention I provide that the parts subject to most wear may be replaced.

The particular construction of this valve and the several modifications thereof will more clearly appear from the accompanying drawings and specification which follow.

Fig. 9 is a longitudinal section of a further modified form of the invention shown in Fig. 1 showing the valve wide open.

Fig. 10 is a longitudinal section of a modified form of the invention shown in Fig. 5 showing the valve wide open.

Fig. 11 is a view partly in elevation and partly in vertical section on the line 11—11, Fig. 12, of the valve head.

Fig. 12 is a bottom end view of the part shown in Fig. 11.

Fig. 13 is a view partly in elevation and partly in vertical section of the valve head shown in Fig. 10.

Fig. 14 is a view partly in elevation and partly in vertical section on the axially offset line 14—14, Fig. 15.

Fig. 15 is a bottom plan view of the part shown in Fig. 14.

Fig. 16 is a horizontal section on the line 16—16, Fig. 18.

Fig. 17 is a vertical section of the part 1C', Fig. 10.

Fig. 18 is a vertical section of the part 1C, Fig. 10.

Corresponding characters are employed throughout the drawings to indicate and refer to corresponding parts.

Figure 1:
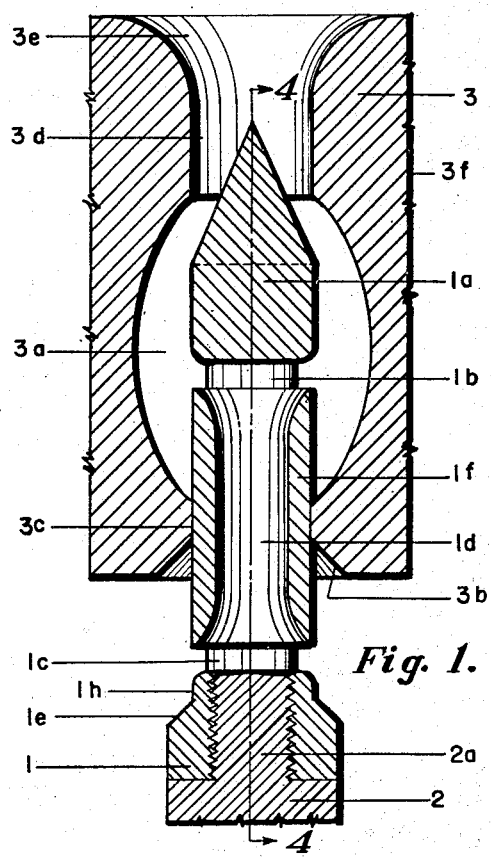
Fig. 1 is a longitudinal section of an assembly of the simplest form of the invention showing the valve wide open.

Similar but somewhat different parts which serve the same purpose in figures illustrating modifications of the invention are designated by adding capital A to the first modification, capital B to the second modification, capital C to the third modification, and so on, to the number used to designate the similar part in the preferred form. Different portions of the same part are referred to by adding $a$, $b$, $c$ and so on (small letters) to the number employed to designate the part as a whole. Duplicated portions of any part are designated by priming the last letter of reference for the first duplication, double priming the last letter of reference for the second duplication, and so on.

My device is adapted for general application where a valve operates to control the flow of fluid through a passage. In the drawings the part 3 may designate the wall of a chamber or a plug to be pressed into or otherwise tightly secured within a pipeline or at either end of a pipe. Said shell has an opening $3d$ within which valve head $1a$ has a close working fit and has another opening $3c$ of restricted diameter which opening affords a close working fit over the tubular portion $1f$. At the lower end of shell 3 a seat $3b$ is provided to engage valve surface $1e$. Intermediate of restricted openings $3c$ and $3d$ is positioned an ellipsoidal opening $3a$ of enlarged diameter.

Valve 1 may be threadedly connected to shaft extension $2a$ of shaft 2. Said valve includes an outwardly inclined shoulder $1e$ to engage the tapered seat $3b$ and a head $1a$ which is cylindrical in shape, except for the tapered end which works in passage $3d$ of the shell. Between the two ends is an axial passage $1d$ which opens at one end through diametrical port to the chamber $3a$. The other end of passage $1d$ has a port through opening $1c$ to the outside. In the open position of the valve as shown in Fig. 1 fluid may pass in either direction through the valve. The flow may enter through funnel shaped opening $3e$ in the shell, pass through opening $3a$, ports $1b$, passage $1d$, and go out through ports $1c$; or the flow may go in the opposite direction as is apparent. Whichever route the flow may take valve seat 3b is far removed from the path of flow and the seat will, therefore, not be damaged by abrasive substances in the fluid that passes through. Valve surface 1c is likewise away from the flow path by the length of straight section 1h. Valve seat 3b and valve surface 1e remain away from the flow path as long as the valve remains open as will appear in Fig. 2, which shows the valve closing. In this position valve head 1a is just entering the opening 3d through which it has a close fit, thus cutting off the further flow of fluid through the valve. It will now be noted that valve seat 3b and valve surface 1e are still, and have always been away from the path of flow in all positions of the valve intermediate the positions shown in Figs. 1 and 2.

Figure 3:
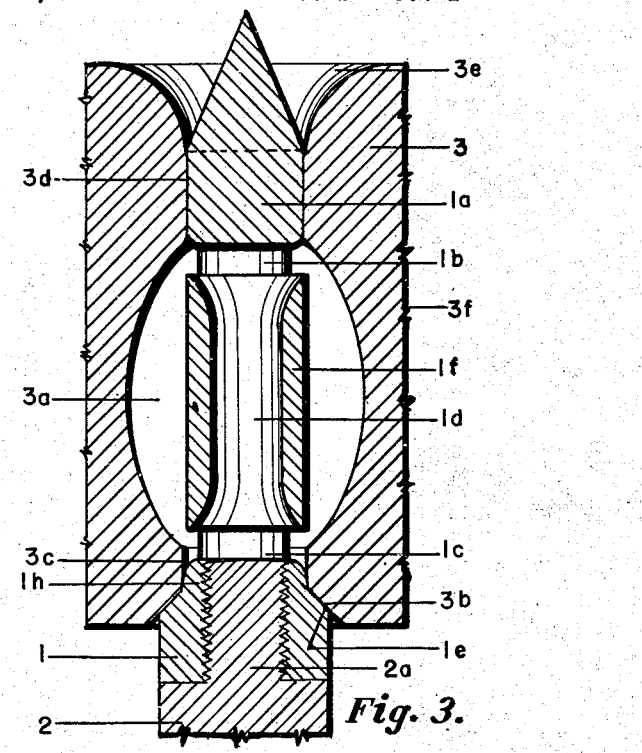
Fig. 3 is a longitudinal section of the assembly shown in Fig. 1 showing the valve closed.
Figure 2:
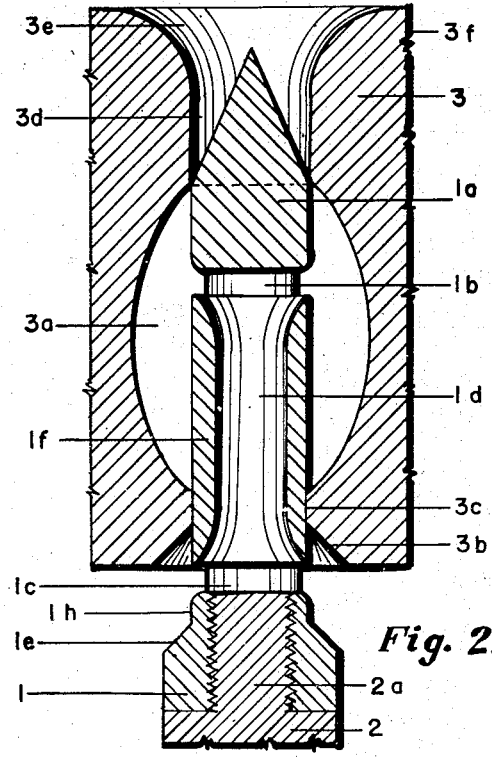
Fig. 2 is a longitudinal section of the assembly shown in Fig. 1 showing the valve half open.
Figure 4:
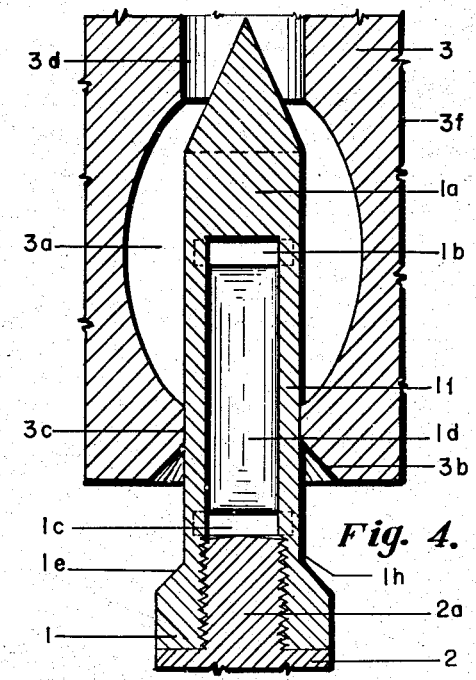
Fig. 4 is a longitudinal section of the assembly shown in Fig. 1 showing the valve rotated 90° upon its axis from the position shown in Fig. 1.

By examining Fig. 3, which shows the valve completely closed, it will be noted that the valve head 1a has continued to engage deeper into opening 3d after and from the time when the closing position has reached the stage shown in Fig. 2. It is, therefore, apparent that as the surface 1e approaches seat 3b the passage of fluid between these surfaces is first cut off by head 1a entering passage 3d, and later this cut off is made more leak proof by the straight section 1h entering the passage 3c. The portion 1f acts as a shield to protect the valve and valve seat by diverting the flow away from them through the opening 1d which is streamlined to afford an easy flow path. Fig. 4 shows the ports 1b and 1e turned axially 90° from the position shown in Figs. 1, 2 and 3.

As stated, it is immaterial whether the direction of flow is one way or the other. It should also be observed that the same valve action will result whether the moving part be the valve 1 or the shell 3.

Means for actuating the movable part may be of any desired form depending upon the character of the installation and as this construction forms no part of the present invention, it is not shown. Such means of housing and operating the valve are, therefore omitted.

Figure 5:
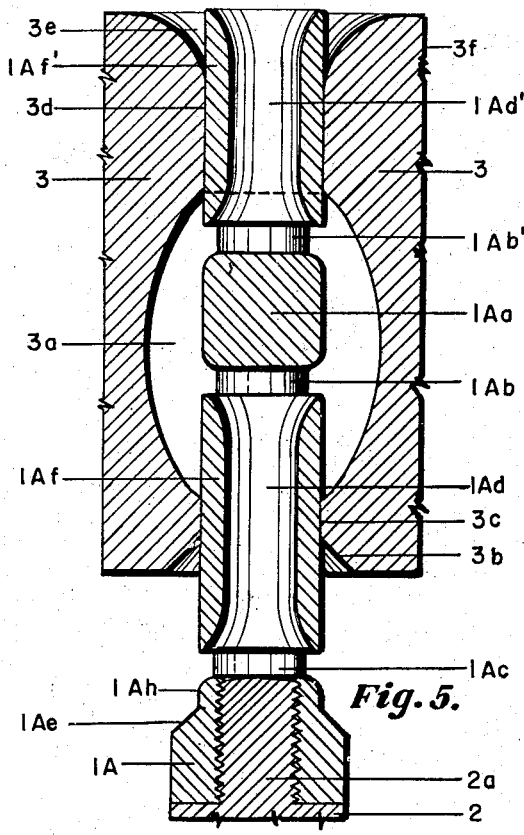
Fig. 5 is a longitudinal section of a modification of the assembly shown in Fig. 1 showing the valve wide open.
Figure 7:
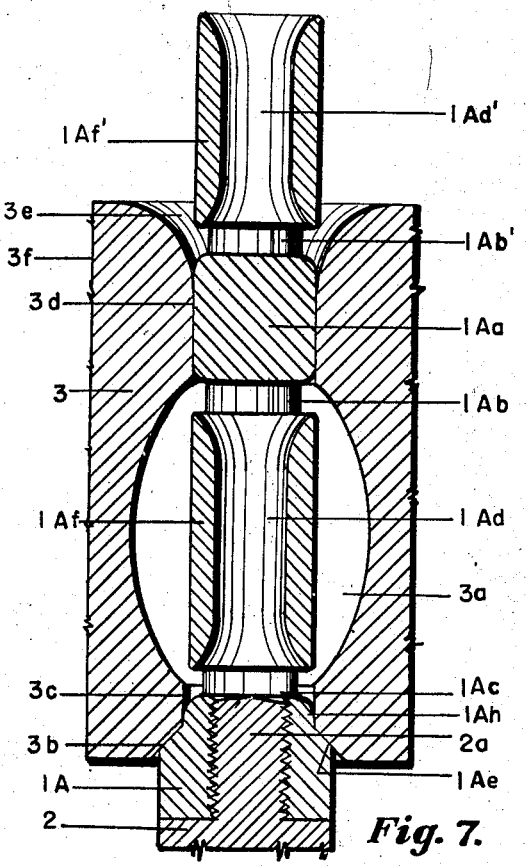
Fig. 7 is a longitudinal section of the assembly shown in Fig. 5 showing the valve closed.
Figure 6:
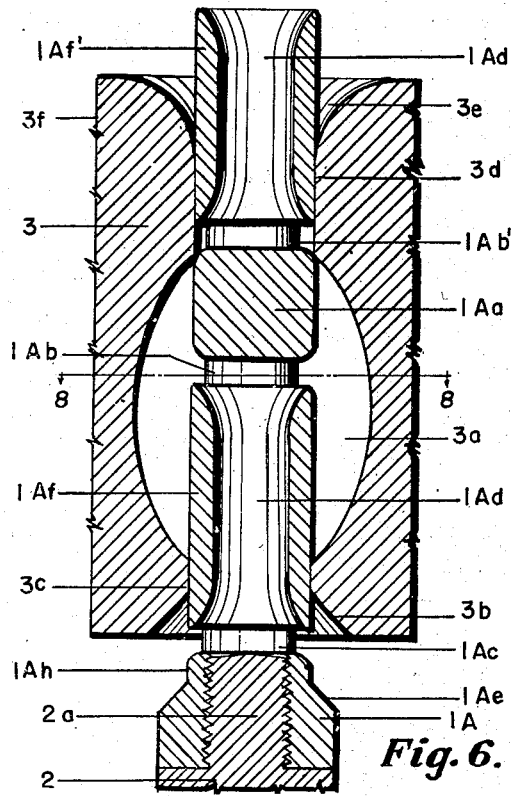
Fig. 6 is a longitudinal section of the assembly shown in Fig. 5 showing the valve half open.
Figure 8:
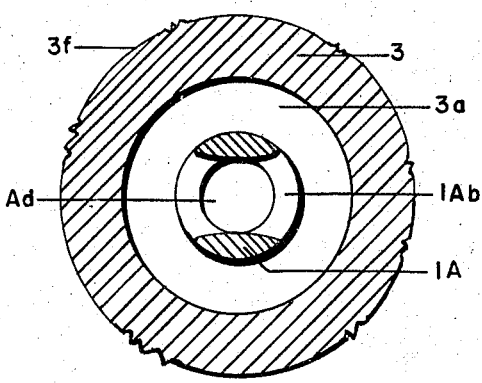
Fig. 8 is a horizontal section on the line 8—8, Fig. 6.

Figs. 5, 6 and 7 illustrating a modification of the valve assembly shown in Figs. 1, 2 and 3, show that an upper sleeve may be provided above valve head 1Aa of valve 1A with flow passage 1Ad' through portion 1Af' which passage will relieve passage 3d from some of the abrasive action of the fluid, the port 1Ab' being provided to admit or discharge (depending upon the direction of flow) the fluid going into or passing out of passage 1Ad'. The position of valve 1A at the time fluid flow is first stopped is shown in Fig. 6. Fig. 7 showing the completely closed position of the valve, may be compared with Fig. 3 to note that the action of valve head 1Aa is the same as that of the similar part 1a in Fig. 3. It will be noted that horizontal port 1Ab, lower horizontal port 1Ac, lower vertical passage 1Ad, valve surface 1Ae, lower tubular portion 1Af, and straight section 1ah correspond in construction and purpose to the similar portions bearing the same numbers without subscripts in Figs. 1, 2, 3, Fig. 9 shows that valve head 1Ba may be threadedly joined to extension 1Bg, so as to be detachable. Also I may employ a sleeve 4 having a funnel shaped end 4e corresponding to the similar portion 3e in Fig. 1 and a central opening 4d to closely receive the valve head 1Ba. This sleeve having threaded engagement into the upper end of shell 3A, may be used so that these parts which stand most of the wear may be quickly and cheaply replaced. Valve body 1B, upper horizontal port 1Bb, lower horizontal port 1Bc, vertical passage 1Bd, valve passage 1Be, tubular portion 1Bf, and straight section 1Bh correspond in construction and purpose to the similar portions bearing the same numbers without subscripts in Figs. 1, 2, 3, and 4.

The ellipsoidal opening 3Aa, valve seat 3Ab, lower restricted opening 3Ac, and outer surface 3Af in Figs. 9 and 10 are the same in use and purpose as the similar portions referred to by the same characters less the letter A in Figs. 1, 2, 3, 4, 5, 6 and 7.

Fig. 10 shows that valve head 1Ca may be slipped over internally threaded upper extension 1Cg' and locked in place by threaded engagement with lower extension 1Cg of the part 1C'. In this construction upper sleeve member 1C' diverts the path of flow through opening 1Cd'. Parts 1Ca, 1C', and sleeve 4 which withstand most of the abrasion provide, as in Fig. 9, that the most usual replacements may be quickly and cheaply made. Valve body 1C, intermediate horizontal ports 1Cb, upper horizontal passages 1Cb', lower horizontal port 1Cc, lower vertical passage 1Cd, valve surface 1Ce, lower tubular portion 1Cf, upper tubular portion 1Cf', and straight section 1Ch correspond in use and purpose to the similar portions referred to in Figs. 5, 6 and 7 by the same characters except that the letter A in Figs. 5, 6 and 7 is changed to C in Fig. 10.

The invention as herein illustrated and described is manifestly subject to such changes in construction and arrangement of parts as will be within the scope and purpose of the stated objects and appended claims.

I claim:

1. In a valve construction, a fluid conductor member, a chamber therein, two aligned circular openings through said chamber, each of said openings being of less diameter than said chamber, a valve seat surrounding the outer end of one of said openings, a valve member adapted to extend through said openings and chamber, said valve member being apportionable into four sectors, the first of said sectors being solid and closely slidable in one of said openings, the second of said sectors being closely slidable in the other of said openings and having an axial conduit therethrough with a transverse port in each end thereof, the third of said sectors being closely slidable within said last opening, and the fourth of said sectors being an enlargement having its end confronting said fluid conducting member formed into a valve engageable with said valve seat, the apportionment of said sectors with relation to said fluid conductor member being such that when said valve is seated both of said transverse ports will be within said chamber and the first of said sectors will be within the one of said openings most remote from said seat, and when said valve is a predetermined distance away from said seat one of said ports will be exterior of and the other within said fluid conductor member while the first of said sectors will be withdrawn from the one of said openings which it closed while said valve was seated, and means connected with said valve member to actuate the same relative to said fluid conductor member.

2. The combination of a fluid conductor member having a chamber therein, two aligned openings of less diameter than said chamber communicating therewith, a valve seat surrounding one of said openings exterior of said conductor, a valve member slidable in said openings, a passage through a portion of said valve member, a valve upon an enlargement of said valve member with a valve thereon engageable with said seat, said passage being adapted to permit fluid to flow through said conductor when said valve and seat are a predetermined distance apart and to prevent such flow when said valve is engaged with said seat, the end of said valve member most remote from said valve being replaceable and so spaced from said valve as to enter the other of said openings as the valve approaches said seat whereby flow through said passage and chamber is substantially terminated as the valve approaches its seat, and means connected to said valve member to actuate the same relative to said conductor.

3. The combination of a fluid conductor member having a chamber therein, two aligned openings of less diameter than said chamber communicating therewith, a valve seat surrounding one of said openings exterior of said conductor, a valve member slidable in said openings, a passage through said valve member, an enlargement on said valve member spaced axially from said passage and having a surface thereon engageable with said seat, said passage being adapted to permit fluid to flow through said conductor when said valve and seat are a predetermined distance apart, and to prevent such flow when said valve is engaged with said seat, the end of said valve member most remote from said valve being replaceable, a removable bushing in said conductor, said bushing being adapted to slidably receive said replaceable end of said valve member, and means connected to said valve member to actuate the same relative to said conductor.

4. A fluid conductor member, a chamber therein, two aligned circular openings through said chamber, each of said openings being of less diameter than said chamber, a valve seat surrounding the outer end of one of said openings, a valve member adapted to extend through said openings and chamber, said valve member being apportionable into five sectors, the first said sector being closely slidable in one of said openings and having an axial passage therethrough and a transverse port between it and the second sector, the third sector being closely slidable in the other of said openings and having another axial passage with transverse ports at each end thereof, the fourth of said sectors being also slidable in said last opening, and the fifth of said sectors being an axial enlargement having its end proximate said seat formed into a valve engageable therewith, the apportionment of said sectors with relation to said conductor being such that when said valve is seated both of said last ports are within said chamber and the first of said ports is proximately beyond the one of said openings most remote from said seat, and when said valve is unseated a predetermined distance, said first sector will be within the other of said openings and the proximate pair of said ports will be within said chamber, and the third of said ports will be exterior of said conductor in spaced relation to said seat, and means connected to said valve member to operate the same relative to said conductor.

5. In combination, a fluid conductor having a chamber therein, two aligned openings of less diameter than said chamber communicating therewith, a valve seat surrounding one of said openings exterior of said conductor, a valve assembly slidable in said openings, the operative features of said assembly being in five aligned sectors, the first having a valve engageable with said seat, the second being spacer means between the first and third, the third having an axial passage with a transverse port at each end thereof, the fourth being spacer means between the third and fifth, and the fifth having an axial passage with a transverse port at the end thereof proximate the fourth; a replaceable sleeve around said fourth sector slidable through one of said openings, means for connecting said fourth and fifth sectors together so as to secure said sleeve and enable said fifth sector to be replaceable also, a replaceable bushing in the one of said openings through which the fifth sector is slidable, said valve assembly being in such relation to said conductor that when said valve is seated the second sector will be in the one of said openings proximate said seat, the transverse ports at each end of the third sector will be in said chamber, the fourth of said sectors will be in the other of said openings, and the transverse port between the fourth and fifth sectors will be beyond the opening in which the fifth sector is slidable, and when said valve is open in spaced relation to said seat one of said transverse ports will be outside of said conductor and the other two of said ports will be within said chamber, and means for moving said valve assembly relative to said conductor.

6. Walls defining a fluid passage, an enlargement intermediate the ends of said passage forming a chamber, upper and lower cylindrical areas in said passage, a valve member shaped to fit closely within said cylindrical areas, one end of said valve being adapted for movement into a position in said chamber below said upper area when the valve is open and to enter said upper area when the valve approaches closed position, the other end of said valve member having a longitudinal bore terminating in spaced ports, said ports being respectively above and below the lower area when the valve is open so that the bore and ports form a by-pass through said valve member and said lower cylindrical area, a valve seat at the outer end of the lower passage, and a valve surface on the valve member adjacent the lowermost port adapted to engage the seat and close the passage.

7. A wall having a fluid passage therethrough, an enlarged chamber intermediate the ends of said passage, a valve member formed to project through the said chamber and fit closely in both ends of said passage when said valve is closed, an axial conduit in said valve member, ports at the ends of said conduit leading to said chamber when said valve is in closed position, a seat on said wall about said passage, a shoulder on said valve engaging said seat, said valve being movable to open position to successively unseat said shoulder, bring one of said ports outside said wall and into spaced relation with said seat and retract the end of the valve member beyond the ports into the chamber whereby a passage is formed for fluid through said ports and to said chamber and through said passage.

ALEXANDER BOYNTON.